(12) United States Patent
Ju et al.

(10) Patent No.: US 9,061,474 B2
(45) Date of Patent: Jun. 23, 2015

(54) TRANSPARENT POLYIMIDE FILM AND PREPARATION METHOD THEREOF

(75) Inventors: Chul Ha Ju, Yongin-si (KR); Hyo Jun Park, Yongin-si (KR); Hak Gee Jung, Yongin-si (KR)

(73) Assignee: KOLON INDUSTRIES, INC., Gwacheon-Si (KR)

( * ) Notice: Subject to any disclaimer, the term of this patent is extended or adjusted under 35 U.S.C. 154(b) by 0 days.

(21) Appl. No.: 13/996,110

(22) PCT Filed: May 27, 2011

(86) PCT No.: PCT/KR2011/003910
§ 371 (c)(1),
(2), (4) Date: Jun. 20, 2013

(87) PCT Pub. No.: WO2012/091232
PCT Pub. Date: Jul. 5, 2012

(65) Prior Publication Data
US 2013/0274394 A1 Oct. 17, 2013

(30) Foreign Application Priority Data

Dec. 31, 2010 (KR) .................. 10-2010-0140834

(51) Int. Cl.
| | | |
|---|---|---|
| C08K 5/5419 | (2006.01) | |
| B29D 11/00 | (2006.01) | |
| C08J 5/18 | (2006.01) | |
| C08K 5/5415 | (2006.01) | |
| C08L 79/08 | (2006.01) | |
| C09D 179/08 | (2006.01) | |
| C08G 73/10 | (2006.01) | |

(52) U.S. Cl.
CPC ......... *B29D 11/00788* (2013.01); *C08K 5/5419* (2013.01); *C08J 5/18* (2013.01); *C08J 2379/08* (2013.01); *C08K 5/5415* (2013.01); *C08L 79/08* (2013.01); *C09D 179/08* (2013.01); *C08G 73/1039* (2013.01); *C08G 73/1042* (2013.01); *C08G 73/1067* (2013.01)

(58) Field of Classification Search
CPC ...... C08J 73/1042; C08J 73/1039; C08J 5/18; C08K 5/5419
USPC .......................................................... 525/431
See application file for complete search history.

(56) References Cited

U.S. PATENT DOCUMENTS

| | | | | |
|---|---|---|---|---|
| 4,200,724 A | * | 4/1980 | Darms et al. | 528/26 |
| 4,963,635 A | * | 10/1990 | Kunimune et al. | 528/26 |
| 4,970,283 A | * | 11/1990 | Kunimune et al. | 528/26 |
| 5,114,757 A | | 5/1992 | Linde et al. | |
| 5,384,376 A | * | 1/1995 | Tunney et al. | 525/431 |
| 2008/0241497 A1 | | 10/2008 | Yamaguchi et al. | |
| 2009/0069508 A1 | | 3/2009 | Poe et al. | |
| 2010/0279131 A1 | | 11/2010 | Park et al. | |
| 2012/0190802 A1 | * | 7/2012 | Poe et al. | 525/431 |

FOREIGN PATENT DOCUMENTS

| | | | |
|---|---|---|---|
| JP | 10-2008-0089217 A | 10/2008 | |
| JP | 2010-538144 A | 12/2010 | |
| KR | 10-1995-0000709 B1 | 1/1995 | |
| KR | 10-2009-0013036 A | 2/2009 | |

* cited by examiner

*Primary Examiner* — Margaret Moore
(74) *Attorney, Agent, or Firm* — Sughrue Mion, PLLC

(57) ABSTRACT

The present invention relates to a transparent polyimide film with improved tensile strength and a preparation method thereof, and more specifically to a colorless, transparent polyimide film having excellent optical properties and improved tear strength at the same time through the use of a monomer containing a functional group or an improver for improving tensile strength, and a preparation method thereof, wherein the functional group is selected from the group consisting of a hexafluoro group, a sulfone group, and an oxy group.

4 Claims, No Drawings

TRANSPARENT POLYIMIDE FILM AND PREPARATION METHOD THEREOF

CROSS REFERENCE TO RELATED APPLICATIONS

This application is a National Stage of International Application No. PCT/KR2011/003910 filed May 27, 2011, claiming priority based on Korean Patent Application No. 10-2010-0140834, filed Dec. 31, 2010, the contents of all of which are incorporated herein by reference in their entirety.

TECHNICAL FIELD

The present invention relates to a polyimide film having improved tear strength.

BACKGROUND ART

Generally, a polyimide (PI) film is formed of a polyimide resin. Here, a polyimide resin is a high heat-resistance resin prepared by a process including the steps of: solution-polymerizing an aromatic dianhydride with an aromatic amine or an aromatic diisocyante to obtain a polyamic acid derivative; and ring-closing and dewatering the polyamic acid derivative at high temperature to imidize the polyamic acid derivative. In order to prepare a polyimide resin, pyromellitic dianhydride (PMDA), biphenyltetracarboxylic dianhydride (BPDA) or the like is used as an aromatic dianhydride, and oxydianiline (ODA), p-phenylenediamine (p-PDA), m-phenylenediamine (m-PDA), methylenedianiline (MDA), bisaminophenylhexafluoropropane (HFDA) or the like is used as an aromatic diamine.

Such a polyimide resin, which is an unmelted ultrahigh heat-resistance resin, has been widely used in the field of high-tech heat-resistant materials, such as automobile materials, aircraft materials, spacecraft materials and the like, and electronic materials, such as insulation coating agents, insulation films, semiconductors, electrode protection films for TFT-LCDs and the like, because it has excellent oxidation resistance, heat resistance, radiation resistance, low-temperature characteristics, chemical resistance and the like. Recently, a polyimide resin has also been used in the field of display materials, such as optical fibers, liquid crystal oriented films and the like, and transparent electrode films by adding conductive filler to the polyimide resin or coating the surface of the polyimide film with conductive filler.

However, a polyimide resin is problematic in that its transparency in a visible light region is low because it is colored brown or yellow due to its high aromatic ring density, in that its light transmittance is low because it provides a yellow color, and in that it is difficult to use it as an optical material because it has high birefringence.

In order to solve such a problem, a method of refining monomers and a solvent and then polymerizing the refined monomers has been attempted, but this method is also problematic in that light transmittance is not greatly improved.

U.S. Pat. No. 5,053,480 discloses a method of preparing a polyimide resin using an aliphatic cyclic dianhydride instead of an aromatic dianhydride. This method is advantageous in that, when the polyimide resin prepared by this method is formed into a solution phase or a film, its transparency and color is improved, but is problematic in that the improvement of transparency thereof is restricted and thus satisfactory transparency cannot be obtained, and in that thermal and mechanical characteristics thereof are deteriorated.

Further, U.S. Pat. Nos. 4,595,548, 4,603,061, 4,645,824, 4,895,972, 5,218,083, 5,093,453, 5,218,077, 5,367,046, 5,338,826, 5,986,036 and 6,232,428 and Korean Unexamined Patent Application Publication No. 2003-0009437 reported a novel polyimide structure, the light transmittance and color transparency of which is improved by using a monomer having a bent structure whose m-site, rather than its p-site, is connected with a functional group such as —O—, —$SO_2$—, —$CH_2$— or the like, an aromatic dianhydride having a substituent group such as —$CF_3$ or the like and an aromatic diamine monomer on the condition that its thermal characteristics are not greatly deteriorated. However, they reported that the tear strength of the novel polyimide structure is 7 N/mm or less, which is insufficient.

DISCLOSURE

Technical Problem

An object of the present invention is to provide a method of preparing a transparent polyimide film having improved tear strength while maintaining the optical properties of a conventional transparent polyimide film.

Another object of the present invention provides a transparent polyimide film having improved tear strength, which is prepared by the method.

Technical Solution

A first aspect of the present invention provides a method of preparing a transparent polyimide film, including the steps of: copolymerizing an aromatic dianhydride and an aromatic diamine to obtain polyamic acid; and casting the polyamic acid on a support to imidize the polyamic acid, wherein the method further includes the step of introducing an additive for improving tear strength before or after obtaining the polyamic acid, or the step of introducing a monomer including a functional group selected from the group consisting of a hexafluoro group, a sulfone group and an oxy group before obtaining the polyamic acid.

In the method, the additive may be at least one selected from among polyphenylsilsesquioxane, tetramethoxy silane, tetraethoxy silane, tetrabutoxy silane, 3-aminopropyl triethoxy silane, and 3-aminopropyl trimethoxy silane.

Further, the additive may be included in an amount of 0.001~20 parts by weight based on 100 parts by weight of the polyamic acid.

A second aspect of the present invention provides a transparent polyimide film, including: a unit structure derived from an aromatic dianhydride and an aromatic diamine, wherein the transparent polyimide film further comprises an additive for improving tear strength, or a unit structure derived from a monomer including a functional group selected from the group consisting of a hexafluoro group, a sulfone group and an oxy group.

In the transparent polyimide film, the additive may be at least one selected from among polyphenylsilsesquioxane, tetramethoxy silane, tetraethoxy silane, tetrabutoxy silane, 3-aminopropyl triethoxy silane, and 3-aminopropyl trimethoxy silane.

Further, the transparent polyimide film may have an average transmittance of 88% or more at a wavelength of 380~780 nm, which is measured by a UV spectrometer based on 50~100 μm of film thickness, a yellowness of 10 or less, a thermal expansion coefficient (CTE) of 45 ppm/° C. at 50~250° C. and a tear strength of 130 N/mm or more.

A third aspect of the present invention provides a substrate for a display device, including the transparent polyimide film.

BEST MODE

Hereinafter, the present invention will be described in detail.

The present invention provides a method of preparing a transparent polyimide film having improved tear strength while maintaining the physical properties of conventional transparent polyimide films having excellent optical transparency, the method being characterized in that an additive for improving tear strength or a monomer including a functional group selected from the group consisting of a hexafluoro group, a sulfone group and an oxy group is used before or after the polymerization of polyamic acid. That is, the method is characterized in that the tear strength of the transparent polyimide film can be improved by cross-linkage using an additive for improving tear strength or can be improved by controlling molecular arrangement in a polymer using a monomer including a functional group selected from the group consisting of a hexafluoro group, a sulfone group and an oxy group.

Specifically, the method of preparing a transparent polyimide film according to the present invention includes the steps of: copolymerizing an aromatic dianhydride and an aromatic diamine to obtain polyamic acid; and casting the polyamic acid on a support to imidize the polyamic acid, wherein the method further includes the step of introducing an additive for improving tear strength before or after obtaining the polyamic acid or the step of introducing a monomer including a functional group selected from the group consisting of a hexafluoro group, a sulfone group and an oxy group before obtaining the polyamic acid.

Conventionally, a diamine and a dianhydride are polymerized in an equivalent ratio of 1:1 to obtain polyamic acid, and then the polyamic acid is imidized.

In the method of preparing a transparent polyimide film according to the present invention, an aromatic dianhydride and an aromatic diamine are copolymerized to obtain polyamic acid, and then the polyamic acid is imidized by the addition of a monomer including a functional group selected from the group consisting of a hexafluoro group, a sulfone group and an oxy group before obtaining the polyamic acid, thereby preparing a transparent polyimide film having improved tear strength.

The aromatic dianhydride used in the present invention may be at least one selected from among 2,2-bis(3,4-dicarboxyphenyl)hexafluoropropane dianhydride (6FDA), 4-(2,5-dioxotetrahydrofuran-3-yl)-1,2,3,4-tetrahydronaphthalene-1,2-dicarboxylic anhydride (TDA), pyromellitic dianhydride (1,2,4,5-benzene tetracarboxylic dianhydride, PMDA), benzophenone tetracarboxylic dianhydride (BTDA), biphenyltetracarboxylic dianhydride (BPDA), and biscarboxyphenyl dimethyl silane dianhydride (SiDA). However, examples of the aromatic dianhydride are not limited thereto.

Meanwhile, the aromatic diamine used in the present invention may be at least one selected from among oxydianiline (ODA), p-phenylenediamine (p-PDA), m-phenylenediamine (m-PDA), p-methylenediamine (p-MDA), m-methylenediamine (m-MDA), bistrifluoromethyl benzidine (TFDB), cyclohexanediamine (13CHD, 14CHD), and bisaminohydroxy phenyl hexafluoropropane (DBOH). However, examples of the aromatic dianhydride are not limited thereto.

Meanwhile, examples of the monomer including a functional group selected from the group consisting of a hexafluoro group, a sulfone group and an oxy group may include oxydiphthalic dianhydride (ODPA), bisdicarboxyphenoxy diphenyl sulfide dianhydride (BDSDA), sulfonyl diphthalic anhydride ($SO_2DPA$), cyclobutane tetracarboxylic dianhydride (CBDA), isopropylidenediphenoxy bisphthalic anhydride (6HBDA), bisaminophenoxy benzene (133APB, 134APB, 144APB), bisaminophenyl hexafluoropropane (33-6F, 44-6F), bisaminophenyl sulfone (4DDS, 3DDS), bisaminophenoxyphenyl hexafluoropropane (4BDAF), bisaminophenoxy phenylpropane (6HMDA), and bisaminophenoxy diphenyl sulfone (DBSDA).

Since the monomer including a functional group selected from the group consisting of a hexafluoro group, a sulfone group and an oxy group in the molecular structure thereof has a bent structure whose m-site, rather than its p-site, is connected with a functional group such as —O—, —$SO_2$—, $CH_2$— or the like, the molecular arrangement in a polymer is controlled without greatly deteriorating the thermal characteristics, transmittance and transparency of a transparent polyimide film, thus improving the tear strength of the transparent polyimide film.

The method of preparing a transparent polyimide film according to the present invention may further include the step of introducing an additive for improving tear strength before or after obtaining the polyamic acid. Here, the additive may be at least one selected from among polyphenylsilsesquioxane, tetramethoxy silane, tetraethoxy silane, tetrabutoxy silane, 3-aminopropyl triethoxy silane, and 3-aminopropyl trimethoxy silane. This additive can improve the tear strength of a transparent polyimide film by cross-linkage.

In this case, in order to improve tear strength while not interfering with the bonding structure of a polymer resin, the amount of the additive may be 0.001~20 parts by weight based on 100 parts by weight of polyamic acid.

In the method of preparing a transparent polyimide film according to the present invention, in the step of copolymerizing three or more kinds of monomers including an aromatic dianhydride and an aromatic diamine, three or more kinds of monomers are dissolved in a solvent, and then copolymerized to obtain a polyamic acid solution.

Although the copolymerization reaction conditions are not particularly limited, it is preferred that reaction temperature be −20~80° C. and reaction time be 2~48 hours. Further, it is more preferred that the copolymerization reaction be performed under an inert gas (argon, nitrogen or the like) atmosphere.

The solvent for solution polymerization reaction of monomers is not particularly limited as long as it can dissolve polyamic acid. As the solvent, at least one polar solvent (commonly-known reaction solvent) selected from among m-cresol, N-methyl-2-pyrrolidone (NMP), dimethylformamide (DMF), dimethylacetamide (DMAc), dimethylsulfoxide (DMSO), acetone and diethyl acetate may be used. In addition, a low-boiling solvent, such as tetrahydrofuran (THF), chloroform or the like, or a low-absorptivity solvent, such as γ-butyrolactone or the like, may be used as the solvent.

The amount of the solvent is not particularly limited. However, in order to obtain a polyamic acid solution having suitable molecular weight and viscosity, the amount of the solvent may be 50~95 wt %, and preferably 70~90 wt %, based on the total weight of a polyamic acid solution.

It is preferred that the polyimide resin prepared by imidizing the polyamic acid solution have a glass transition temperature of 200~400° C. in consideration of thermal stability.

In the method of preparing a transparent polyimide film according to the present invention, in the step of casting the polyamic acid on a support to imidize the polyamic acid, the imidization of the polyamic acid solution may be performed by thermal imidization, chemical imidization or a combination of thermal imidization and chemical imidization.

In the chemical imidization, a dehydration agent, which is represented by an acid anhydride such as acetic anhydride or the like, and an imidization catalyst, which is represented by a tertiary amine such as isoquinoline, β-picoline, pyridine or the like, are added to the polyamic acid solution. In the thermal imidization or the combination of thermal imidization and chemical imidization, the heating conditions of the polyamic acid solution can be changed by the kind of the polyamic acid solution and the thickness of a polyimide film to be prepared.

In the case of a combination of thermal imidization and chemical imidization, a preparation example of a polyimide film is specifically described as follows. First, a dehydration agent and an imidization catalyst are added to a polyamic acid solution, and then cast on a support. Then, the cast polyamic acid solution is heated to 80~200° C., preferably, 100~180° C. to activate the hydration agent and the imidization catalyst to partially cure and dry the polyamic acid solution, thus separating a gelled polyamic acid film from the support. Then, the gelled polyamic acid film is fixed on a frame and then heated to 200~400° C. for 5~400 seconds to obtain a polyimide film. In this case, the gelled polyamic acid film may be fixed on the frame using a pin or clip. As the support, a glass plate, aluminum foil, a stainless steel belt, a stainless steel drum or the like may be used.

Meanwhile, in the present invention, a polyimide film may also be prepared from the obtained polyamic acid solution as follows. That is, after the obtained polyamic acid solution is imidized, the imidized polyamic acid solution is introduced into a second solvent, and then precipitated, filtered and dried to obtain a polyimide resin solid. Then, the obtained polyimide resin solid is dissolved in the first solvent to form a polyimide solution, and then polyimide solution is formed into a polyimide film by a film-forming process.

As described above, the imidization of the polyamic acid solution may be performed by thermal imidization, chemical imidization or a combination of thermal imidization and chemical imidization. According to a specific example of imidizing the polyamic acid solution using a combination of thermal imidization and chemical imidization, the polyamic acid solution can be imidized by adding a dehydration agent and an imidization catalyst to the obtained polyamic acid solution and then heating the polyamic acid solution to 20~180° C. for 1~12 hours.

The first solvent may be the same as the solvent used in the solution polymerization of polyamic acid. As the second solvent, a solvent having lower polarity than the first solvent may be used in order to obtain a polyimide resin solid. Specifically, the second solvent may be at least one selected from among water, alcohols, ethers and ketones.

In this case, although the amount of the second solvent is not particularly limited, it is preferred that the second solvent be used in an amount of 5~20 times the total weight of the polyamic acid solution.

After the obtained polyimide resin solid is filtered, the filtered polyimide resin solid may be dried at a temperature of 50~120° C. for 3~24 hours, in consideration of the boiling point of the second solvent.

Thereafter, in a film-forming process, the polyimide solution, in which a polyimide resin solid is dissolved, is cast on a support, and then slowly heated to 40~400° C. for 1 minute~8 hours to obtain a polyimide film.

In the present invention, the obtained polyimide film may further be heat-treated. In this case, it is preferred that heat treatment temperature be 100~500° C., and heat treatment time be 1~30 minutes.

As described above, when the obtained polyimide film is further heat-treated, thermal hysteresis and residual stress remaining in the polyimide film are removed, so thermal stability is improved, thereby obtaining stable physical properties, such as stable thermal expansion coefficient and the like.

The amount of volatile components remaining in the heat-treated polyimide film may be 5% or less, and preferably 3% or less.

The thickness of the obtained polyimide film is not particularly limited. However, the thickness of the polyimide film may be 10~250 μm, and preferably 25~150 μm.

A transparent polyimide film including three or more kinds of monomers (including an aromatic dianhydride and an aromatic diamine) and an additive for improving tear strength can be prepared using the above-mentioned method. This transparent polyimide film has an average transmittance of 88% or more at a wavelength of 380~780 nm (the average transmittance being measured by a UV spectrometer based on 50~100 μm of film thickness), a yellowness of 10 or less, a thermal expansion coefficient (CTE) of 45 ppm/° C. at 50~250° C. and a tear strength of 130 N/mm or more.

This transparent polyimide film having excellent light transmittance, yellowness, thermal characteristics and tear strength can be applied to substrates for display devices.

Mode for Invention

Hereinafter, the present invention will be described in more detail with reference to the following Examples. However, the scope of the present invention is not limited to these Examples.

Example 1

A 1 L reactor provided with a stirrer, a nitrogen injector, a dripping funnel, a temperature controller and a cooler was filled with 564 g of N,N-dimethylacetamide (DMAc) while passing nitrogen through the reactor, the temperature of the reactor was adjusted to 25° C., 0.71 g of polyphenylsilsesquioxane was completely dissolved in the N,N-dimethylacetamide (DMAc), 64.046 g (0.2 mol) of TFDB was additionally dissolved therein to obtain a solution, and then the temperature of the solution was maintained at 25° C. Subsequently, 23.538 g (0.08 mol) of BPDA was added to this solution, and then stirred for 3 hours to completely dissolve the BPDA. In this case, the temperature of this solution was maintained at 25° C. Subsequently, 53.31 g (0.12 mol) of 6FDA was added to the solution to obtain a polyamic acid solution having a solid content of 20 wt %.

The polyamic acid solution was stirred at room temperature for 8 hours. Then, 31.64 g of pyridine and 40.804 g of acetic anhydride were added to the polyamic acid solution, and then this polyamic acid solution was stirred for 30 minutes and further stirred at 80° C. for 2 hours to be cooled to room temperature. Then, this cooled polyamic acid solution was slowly introduced into a container filled with 20 L of methanol to be precipitated to obtain a solid precipitate. Then, the solid precipitate was filtered, pulverized and then dried in vacuum at 80° C. for 6 hours to obtain 120 g of solid powder. This solid powder was dissolved in 480 g of N,N-dimethylacetamide (DMAc) again to obtain a solution containing 20 wt % of solid powder and having a viscosity of 3200 poise.

After the reaction, the obtained solution was applied onto a stainless steel plate, cast to a thickness of 700 μm, and then dried by hot air at 150° C. for 1 hour to obtain a polyimide film. This polyimide film was detached from the stainless steel plate, and was then fixed on a frame by a pin.

The frame fixed with the polyimide film was put into a vacuum oven, slowly heated from 100° C. to 300° C. for 2 hours, and then slowly cooled to separate the polyimide film from the frame. Then, the separated polyimide film was heat-treated at 300° C. for 30 minutes to obtain a polyimide film having a thickness of 100 μm.

Example 2

A 1 L reactor provided with a stirrer, a nitrogen injector, a dripping funnel, a temperature controller and a cooler was filled with 564 g of N,N-dimethylacetamide (DMAc) while passing nitrogen through the reactor, the temperature of the reactor was adjusted to 25° C., 2.113 g of polyphenylsilsesquioxane was completely dissolved in the N,N-dimethylacetamide (DMAc), 64.046 g (0.2 mol) of TFDB was additionally dissolved therein to obtain a solution, and then the temperature of the solution was maintained at 25° C. Subsequently, 23.538 g (0.08 mol) of BPDA was added to this solution, and then stirred for 3 hours to completely dissolve the BPDA. In this case, the temperature of this solution was maintained at 25° C. Subsequently, 53.31 g (0.12 mol) of 6FDA was added to the solution to obtain a polyamic acid solution having a solid content of 20 wt %.

The polyamic acid solution was stirred at room temperature for 8 hours. Then, 31.64 g of pyridine and 40.804 g of acetic anhydride were added to the polyamic acid solution, and then this polyamic acid solution was stirred for 30 minutes and further stirred at 80° C. for 2 hours to be cooled to room temperature. Then, this cooled polyamic acid solution was slowly introduced into a container filled with 20 L of methanol to be precipitated to obtain a solid precipitate. Then, the solid precipitate was filtered, pulverized and then dried in vacuum at 80° C. for 6 hours to obtain 120 g of solid powder. This solid powder was dissolved in 480 g of N,N-dimethylacetamide (DMAc) again to obtain a solution containing 20 wt % of solid powder and having a viscosity of 3300 poise.

Thereafter, a polyimide film having a thickness of 100 μm was obtained in the same manner as in Example 1.

Example 3

A 1 L reactor provided with a stirrer, a nitrogen injector, a dripping funnel, a temperature controller and a cooler was filled with 564 g of N,N-dimethylacetamide (DMAc) while passing nitrogen through the reactor, the temperature of the reactor was adjusted to 25° C., 3.522 g of polyphenylsilsesquioxane was completely dissolved in the N,N-dimethylacetamide (DMAc), 64.046 g (0.2 mol) of TFDB was additionally dissolved therein to obtain a solution, and then the temperature of the solution was maintained at 25° C. Subsequently, 23.538 g (0.08 mol) of BPDA was added to this solution, and then stirred for 3 hours to completely dissolve the BPDA. In this case, the temperature of this solution was maintained at 25° C. Subsequently, 53.31 g (0.12 mol) of 6FDA was added to the solution to obtain a polyamic acid solution having a solid content of 20 wt %.

The polyamic acid solution was stirred at room temperature for 8 hours. Then, 31.64 g of pyridine and 40.804 g of acetic anhydride were added to the polyamic acid solution, and then this polyamic acid solution was stirred for 30 minutes and further stirred at 80° C. for 2 hours to be cooled to room temperature. Then, this cooled polyamic acid solution was slowly introduced into a container filled with 20 L of methanol to be precipitated to obtain a solid precipitate. Then, the solid precipitate was filtered, pulverized and then dried in vacuum at 80° C. for 6 hours to obtain 120 g of solid powder. This solid powder was dissolved in 480 g of N,N-dimethylacetamide (DMAc) again to obtain a solution containing 20 wt % of solid powder and having a viscosity of 3500 poise.

Thereafter, a polyimide film having a thickness of 100 μm was obtained in the same manner as in Example 1.

Example 4

A 1 L reactor provided with a stirrer, a nitrogen injector, a dripping funnel, a temperature controller and a cooler was filled with 564 g of N,N-dimethylacetamide (DMAc) while passing nitrogen through the reactor, the temperature of the reactor was adjusted to 25° C., 64.046 g (0.2 mol) of TFDB was dissolved in the N,N-dimethylacetamide (DMAc) to obtain a solution, and then the temperature of the solution was maintained at 25° C. Subsequently, 23.538 g (0.08 mol) of BPDA was added to this solution, and then stirred for 3 hours to completely dissolve the BPDA. In this case, the temperature of this solution was maintained at 25° C. Subsequently, 53.31 g (0.12 mol) of 6FDA was added to the solution to obtain a polyamic acid solution having a solid content of 20 wt %.

Subsequently, 3 g of polyphenylsilsesquioxane was added to 300 g of the polyamic acid solution (viscosity: 3200 poise), and then stirred to obtain a solution. The obtained solution was applied onto a stainless steel plate, cast to a thickness of 700 μm, and then dried by hot air at 150° C. for 1 hour to obtain a polyimide film. This polyimide film was detached from the stainless steel plate, and was then fixed on a frame by a pin.

The frame fixed with the polyimide film was put into a vacuum oven, slowly heated from 100° C. to 300° C. for 2 hours, and then slowly cooled to separate the polyimide film from the frame. Then, the separated polyimide film was heat-treated at 300° C. for 30 minutes to obtain a polyimide film having a thickness of 100 μm.

Example 5

A 1 L reactor provided with a stirrer, a nitrogen injector, a dripping funnel, a temperature controller and a cooler was filled with 564 g of N,N-dimethylacetamide (DMAc) while passing nitrogen through the reactor, the temperature of the reactor was adjusted to 25° C., 64.046 g (0.2 mol) of TFDB was dissolved in the N,N-dimethylacetamide (DMAc) to obtain a solution, and then the temperature of the solution was maintained at 25° C. Subsequently, 23.538 g (0.08 mol) of BPDA was added to this solution, and then stirred for 3 hours to completely dissolve the BPDA. In this case, the temperature of this solution was maintained at 25° C. Subsequently, 53.31 g (0.12 mol) of 6FDA was added to the solution to obtain a polyamic acid solution having a solid content of 20 wt %.

Subsequently, 9 g of polyphenylsilsesquioxane was added to 300 g of the polyamic acid solution (viscosity: 3200 poise), and then stirred to obtain a solution. The obtained solution was applied onto a stainless steel plate, cast to a thickness of 700 μm, and then dried by hot air at 150° C. for 1 hour to obtain a polyimide film. This polyimide film was detached from the stainless steel plate, and was then fixed on a frame by a pin.

The frame fixed with the polyimide film was put into a vacuum oven, slowly heated from 100° C. to 300° C. for 2 hours, and then slowly cooled to separate the polyimide film from the frame. Then, the separated polyimide film was heat-treated at 300° C. for 30 minutes to obtain a polyimide film having a thickness of 100 μm.

Example 6

A 1 L reactor provided with a stirrer, a nitrogen injector, a dripping funnel, a temperature controller and a cooler was filled with 564 g of N,N-dimethylacetamide (DMAc) while passing nitrogen through the reactor, the temperature of the reactor was adjusted to 25° C., 64.046 g (0.2 mol) of TFDB was dissolved in the N,N-dimethylacetamide (DMAc) to obtain a solution, and then the temperature of the solution was maintained at 25° C. Subsequently, 23.538 g (0.08 mol) of BPDA was added to this solution, and then stirred for 3 hours to completely dissolve the BPDA. In this case, the temperature of this solution was maintained at 25° C. Subsequently, 53.31 g (0.12 mol) of 6FDA was added to the solution to obtain a polyamic acid solution having a solid content of 20 wt %.

Subsequently, 15 g of polyphenylsilsesquioxane was added to 300 g of the polyamic acid solution (viscosity: 3200 poise), and then stirred to obtain a solution. The obtained solution was applied onto a stainless steel plate, cast to a thickness of 700 μm, and then dried by hot air at 150° C. for 1 hour to obtain a polyimide film. This polyimide film was detached from the stainless steel plate, and was then fixed on a frame by a pin.

The frame fixed with the polyimide film was put into a vacuum oven, slowly heated from 100° C. to 300° C. for 2 hours, and then slowly cooled to separate the polyimide film from the frame. Then, the separated polyimide film was heat-treated at 300° C. for 30 minutes to obtain a polyimide film having a thickness of 100 μm.

Example 7

A 1 L reactor provided with a stirrer, a nitrogen injector, a dripping funnel, a temperature controller and a cooler was filled with 563 g of N,N-dimethylacetamide (DMAc) while passing nitrogen through the reactor, the temperature of the reactor was adjusted to 25° C., 62.125 g (0.194 mol) of TFDB was completely dissolved in the N,N-dimethylacetamide (DMAc), 1.754 g (0.006 mol) of 134APB was additionally dissolved therein to obtain a solution, and then the temperature of the solution was maintained at 25° C. Subsequently, 23.538 g (0.08 mol) of BPDA was added to this solution, and then stirred for 3 hours to completely dissolve the BPDA. In this case, the temperature of this solution was maintained at 25° C. Subsequently, 53.31 g (0.12 mol) of 6FDA was added to the solution to obtain a polyamic acid solution having a solid content of 20 wt %.

The polyamic acid solution was stirred at room temperature for 8 hours. Then, 31.64 g of pyridine and 40.804 g of acetic anhydride were added to the polyamic acid solution, and then this polyamic acid solution was stirred for 30 minutes and further stirred at 80° C. for 2 hours to be cooled to room temperature. Then, this cooled polyamic acid solution was slowly introduced into a container filled with 20 L of methanol to be precipitated to obtain a solid precipitate. Then, the solid precipitate was filtered, pulverized and then dried in vacuum at 80° C. for 6 hours to obtain 120 g of solid powder. This solid powder was dissolved in 480 g of N,N-dimethylacetamide (DMAc) again to obtain a solution containing 20 wt % of solid powder and having a viscosity of 3300 poise.

Thereafter, a polyimide film having a thickness of 100 μm was obtained in the same manner as in Example 1.

Example 8

A 1 L reactor provided with a stirrer, a nitrogen injector, a dripping funnel, a temperature controller and a cooler was filled with 563 g of N,N-dimethylacetamide (DMAc) while passing nitrogen through the reactor, the temperature of the reactor was adjusted to 25° C., 60.845 g (0.19 mol) of TFDB was completely dissolved in the N,N-dimethylacetamide (DMAc), 2.923 g (0.01 mol) of 134APB was additionally dissolved therein to obtain a solution, and then the temperature of the solution was maintained at 25° C. Subsequently, 23.538 g (0.08 mol) of BPDA was added to this solution, and then stirred for 3 hours to completely dissolve the BPDA. In this case, the temperature of this solution was maintained at 25° C. Subsequently, 53.31 g (0.12 mol) of 6FDA was added to the solution to obtain a polyamic acid solution having a solid content of 20 wt %.

The polyamic acid solution was stirred at room temperature for 8 hours. Then, 31.64 g of pyridine and 40.804 g of acetic anhydride were added to the polyamic acid solution, and then this polyamic acid solution was stirred for 30 minutes and further stirred at 80° C. for 2 hours to be cooled to room temperature. Then, this cooled polyamic acid solution was slowly introduced into a container filled with 20 L of methanol to be precipitated to obtain a solid precipitate. Then, the solid precipitate was filtered, pulverized and then dried in vacuum at 80° C. for 6 hours to obtain 120 g of solid powder. This solid powder was dissolved in 480 g of N,N-dimethylacetamide (DMAc) again to obtain a solution containing 20 wt % of solid powder and having a viscosity of 3300 poise.

Thereafter, a polyimide film having a thickness of 100 μm was obtained in the same manner as in Example 1.

Comparative Example 1

A 1 L reactor provided with a stirrer, a nitrogen injector, a dripping funnel, a temperature controller and a cooler was filled with 564 g of N,N-dimethylacetamide (DMAc) while passing nitrogen through the reactor, the temperature of the reactor was adjusted to 25° C., 64.046 g (0.2 mol) of TFDB was dissolved in the N,N-dimethylacetamide (DMAc) to obtain a solution, and then the temperature of the solution was maintained at 25° C. Subsequently, 23.538 g (0.08 mol) of BPDA was added to this solution, and then stirred for 3 hours to completely dissolve the BPDA. In this case, the temperature of this solution was maintained at 25° C. Subsequently, 53.31 g (0.12 mol) of 6FDA was added to the solution to obtain a polyamic acid solution having a solid content of 20 wt %.

The polyamic acid solution was stirred at room temperature for 8 hours. Then, 31.64 g of pyridine and 40.804 g of acetic anhydride were added to the polyamic acid solution, and then this polyamic acid solution was stirred for 30 minutes and further stirred at 80° C. for 2 hours to be cooled to room temperature. Then, this cooled polyamic acid solution was slowly introduced into a container filled with 20 L of methanol to be precipitated to obtain a solid precipitate. Then, the solid precipitate was filtered, pulverized and then dried in vacuum at 80° C. for 6 hours to obtain 120 g of solid powder. This solid powder was dissolved in 480 g of N,N-dimethylacetamide (DMAc) again to obtain a solution containing 20 wt % of solid powder and having a viscosity of 3200 poise.

Thereafter, a polyimide film having a thickness of 100 μm was obtained in the same manner as in Example 1.

Comparative Example 2

A 1 L reactor provided with a stirrer, a nitrogen injector, a dripping funnel, a temperature controller and a cooler was filled with 587 g of N,N-dimethylacetamide (DMAc) while passing nitrogen through the reactor, the temperature of the reactor was adjusted to 25° C., 64.046 g (0.2 mol) of TFDB was dissolved in the N,N-dimethylacetamide (DMAc) to obtain a solution, and then the temperature of the solution was maintained at 25° C. Subsequently, 11.767 g (0.04 mol) of BPDA was added to this solution, and then stirred for 3 hours to completely dissolve the BPDA. In this case, the temperature of this solution was maintained at 25° C. Subsequently, 71.08 g (0.16 mol) of 6FDA was added to the solution to obtain a polyamic acid solution having a solid content of 20 wt %.

The polyamic acid solution was stirred at room temperature for 8 hours. Then, 31.64 g of pyridine and 40.804 g of acetic anhydride were added to the polyamic acid solution, and then this polyamic acid solution was stirred for 30 minutes and further stirred at 80° C. for 2 hours to be cooled to room temperature. Then, this cooled polyamic acid solution was slowly introduced into a container filled with 20 L of methanol to be precipitated to obtain a solid precipitate. Then, the solid precipitate was filtered, pulverized and then dried in vacuum at 80° C. for 6 hours to obtain 120 g of solid powder. This solid powder was dissolved in 480 g of N,N-dimethylacetamide (DMAc) again to obtain a solution containing 20 wt % of solid powder and having a viscosity of 1200 poise.

Thereafter, a polyimide film having a thickness of 100 μm was obtained in the same manner as in Example 1.

The physical properties of each of the polyimide films of Examples 1 to 8 and Comparative Examples 1 and 2 were evaluated by the following method, and the results thereof are shown in Table 1 below.

(1) Transmittance

Average transmittance of each polyimide film at a wavelength of 380~780 nm was measured using a UV spectrometer (Cary100, manufactured by Varian Corporation).

(2) Yellowness

Yellowness of each polyimide film was measured based on the ASTM E313 standards.

(3) Thermal Expansion Coefficient (CTE)

Thermal expansion coefficients of each polyimide film at 50~250° C. were measured three times (first run, second run and third run) using a thermo-mechanical analyzer (TMA) (Diamond TMA, manufactured by Perkin Elmer Corporation) according to TMA method. The average thermal expansion coefficient thereof was obtained by calculating the values measured at second run and third run, excluding first run.

(4) Tear Strength

Tear strength of each polyimide film at a tension rate of 50 mm/min was measured based on the ASTM D1004 standards.

TABLE 1

| | Composition | Molar ratio | Thickness (μm) | Yellowness | Transmittance (%) | CTE (ppm/° C.) | Tear strength (N/mm) MD | TD |
|---|---|---|---|---|---|---|---|---|
| Ex. 1 | 6FDA/BPDA/TFDB + PPSQ① | 6/4/10 | 100 ± 5 | 3.37 | 89.89 | 42.17 | 148.8 | 138.7 |
| Ex. 2 | 6FDA/BPDA/TFDB + PPSQ① | 6/4/10 | 100 ± 5 | 4.08 | 89.84 | 41.29 | 162.5 | 142.4 |
| Ex. 3 | 6FDA/BPDA/TFDB + PPSQ① | 6/4/10 | 100 ± 5 | 3.83 | 89.99 | 40.93 | 180.6 | 150.5 |
| Ex. 4 | 6FDA/BPDA/TFDB + PPSQ② | 6/4/10 | 100 ± 5 | 4.46 | 89.43 | 42.87 | 147.3 | 137.5 |
| Ex. 5 | 6FDA/BPDA/TFDB + PPSQ② | 6/4/10 | 100 ± 5 | 5.84 | 88.85 | 44.60 | 161.9 | 143.7 |
| Ex. 6 | 6FDA/BPDA/TFDB + PPSQ② | 6/4/10 | 100 ± 5 | 5.32 | 88.08 | 43.51 | 184.6 | 151.4 |
| Ex. 7 | 6FDA/BPDA/TFDB/134APB | 6/4/9.7/0.3 | 100 ± 5 | 7.48 | 89.26 | 42.31 | 172.2 | 153.4 |
| Ex. 8 | 6FDA/BPDA/TFDB/134APB | 6/4/9.5/0.5 | 100 ± 5 | 9.82 | 89.72 | 43.37 | 158.7 | 140.5 |
| Comp. Ex. 1 | 6FDA/BPDA/TFDB | 6/4/10 | 100 ± 5 | 4.14 | 89.81 | 41.74 | 144.4 | 130.1 |
| Comp. Ex. 2 | 6FDA/BPDA/TFDB | 8/2/10 | 100 ± 5 | 3.27 | 90.43 | 48.57 | 131.5 | 118.9 |

①additive was added to polyamic acid solution before polymerization
②additive was mixed after preparation of polyamic acid From the results of evaluation of physical properties of each of the polyimide films of Examples 1 to 8 and Comparative Examples 1 and 2, it can be ascertained that the polyimide films of Examples 1 to 6, each of which was prepared using an additive, and the polyimide films of Examples 7 and 8, each of which was prepared using 134APB, have excellent tear strength as well as excellent yellowness, transmittance and CTE.

In contrast, it can be ascertained that the tear strengths of the polyimide films of Comparative Examples 1 and 2, each of which was prepared by only an aromatic dianhydride and an aromatic diamine, are lower than those of the polyimide films of Examples 1 to 8.

Consequently, it can be ascertained that the transparent polyimide films of Examples 1 to 8 have improved tear strength while maintaining the optical properties of conventional transparent polyimide films, so they can be applied to substrates for display devices requiring predetermined strength.

The invention claimed is:

1. A method of preparing a transparent polyimide film, comprising the steps of:
    copolymerizing an aromatic dianhydride and a diamine to obtain a polyamic acid;
    casting the polyamic acid on a support to imidize the polyamic acid; and
    introducing polyphenylsilsesquioxane as an additive for improving tear strength before or after obtaining the polyamic acid,
    wherein the aromatic dianhydride is at least one selected from the group consisting of 2,2-bis(3,4-dicarboxyphenyl)hexafluoropropane dianhydride, 4-(2,5-dioxotetrahydrofuran-3-yl)-1,2,3,4-tetrahydronaphthalene-1,2-dicarboxylic anhydride, pyromellitic dianhydride, benzophenone tetracarboxylic dianhydride, biphenyltetracarboxylic dianhydride, and biscarboxyphenyl dimethyl silane dianhydride, wherein the aromatic dianhydride necessarily includes the 2,2-bis(3,4-dicarboxyphenyl)hexafluoropropane dianhydride; and the diamine is at least one selected from the group consisting of oxydianiline, p-phenylenediamine, m-phenylenediamine, p-methylenedianiline, m-methylenedianiline, bistrifluoromethyl benzidine, cyclohexane-1,3-diamine, cyclohexane-1,4-diamine, and bisaminohydroxy phenyl hexafluoropropane, wherein the aromatic diamine necessarily includes the bistrifluoromethyl benzidine.

2. A transparent polyimide film, comprising:

a unit structure derived from an aromatic dianhydride and a diamine, wherein the transparent polyimide film further comprises polyphenylsilsesquioxane as an additive for improving tear strength, wherein the aromatic dianhydride is at least one selected from the group consisting of 2,2-bis(3,4-dicarboxyphenyl)hexafluoropropane dianhydride, 4-(2,5-dioxotetrahydrofuran-3-yl)-1,2,3,4-tetrahydronaphthalene-1,2-dicarboxylic anhydride, pyromellitic dianhydride, benzophenone tetracarboxylic dianhydride, biphenyltetracarboxylic dianhydride, and biscarboxyphenyl dimethyl silane dianhydride, wherein the aromatic dianhydride necessarily includes the 2,2-bis(3,4-dicarboxyphenyl)hexafluoropropane dianhydride;

the diamine is at least one selected from the group consisting of oxydianiline, p-phenylenediamine, m-phenylenediamine, p-methylenedianiline, m-methylenedianiline, bistrifluoromethyl benzidine, cyclohexane-1,3-diamine, cyclohexane-1,4-diamine, and bisaminohydroxy phenyl hexafluoropropane, (wherein the aromatic diamine necessarily includes the bistrifluoromethyl benzidine; and the transparent polyimide film has an average transmittance of 88% or more at a wavelength of 380-780 nm, which is measured by a UV spectrometer based on 50-100 μm of film thickness, a yellowness of 10 or less, a thermal expansion coefficient of 45 ppm/° C. at 50-250° C., a tear strength in a length direction 137.5 N/mm or more, and a tear strength in a width direction of 137.5 N/mm or more.

3. A substrate for a display device, comprising the transparent polyimide film of claim 2.

4. The method of claim 1, wherein the additive is included in an amount of 0.001-20 parts by weight based on 100 parts by weight of the polyamic acid.

* * * * *